(12) United States Patent
Wenzel et al.

(10) Patent No.: US 8,363,767 B2
(45) Date of Patent: Jan. 29, 2013

(54) METHOD AND DEVICE FOR TRANSFERRING DATA

(75) Inventors: Dietmar Wenzel, Munich (DE); Berndt Pilgram, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1053 days.

(21) Appl. No.: 12/353,029

(22) Filed: Jan. 13, 2009

(65) Prior Publication Data
US 2010/0177808 A1 Jul. 15, 2010

(51) Int. Cl.
*H04L 7/00* (2006.01)
(52) U.S. Cl. ........................................................ 375/354
(58) Field of Classification Search ................... 375/354
See application file for complete search history.

(56) References Cited

U.S. PATENT DOCUMENTS

| 3,388,349 A | 6/1968 | Ault | |
|---|---|---|---|
| 2004/0081205 A1* | 4/2004 | Coulson | 370/503 |
| 2006/0038738 A1* | 2/2006 | Shtrom | 343/876 |

* cited by examiner

*Primary Examiner* — Don N Vo
(74) *Attorney, Agent, or Firm* — SpryIP, LLC (57) ABSTRACT

The invention relates to a method including a step of providing a clock having a clock period, wherein an integer multiple of the clock period defines a periodic time grid. In a further step, data packets are transferred between a baseband assembly and a radio-frequency assembly, wherein the times of the start of the transfers are offset with respect to the times of the periodic time grid.

25 Claims, 5 Drawing Sheets

METHOD AND DEVICE FOR TRANSFERRING DATA

FIELD OF THE INVENTION

The invention relates to the technique of transferring data. More particularly, the invention relates to data transfer via an interface in a mobile radio device.

BACKGROUND OF THE INVENTION

Mobile radio transceivers may comprise baseband assemblies and radio-frequency assemblies which are coupled to one another via interfaces. Data may be transferred between these assemblies via the interfaces. During an operation of a mobile radio transceiver, there may occur electromagnetic emissions produced by components of the transceiver.

BRIEF DESCRIPTION OF THE DRAWINGS

Aspects of the invention are made more evident by way of example in the following detailed description of embodiments when read in conjunction with the attached drawing figures.

DETAILED DESCRIPTION OF THE INVENTION

Embodiments are explained below with reference to the figures. To assist clarity, numerous specific details are presented below in order to convey a better understanding of one or more aspects of the embodiments. However, it is evident to a person skilled in the art that one or more embodiments can also be implemented with a smaller number of these specific details. Accordingly, the following description should not be understood to be restrictive. Particular features which are disclosed merely in terms of one specific embodiment may be combined with one or more features of other embodiments as long as this is technically possible and appropriate for a particular embodiment.

Figure 1:
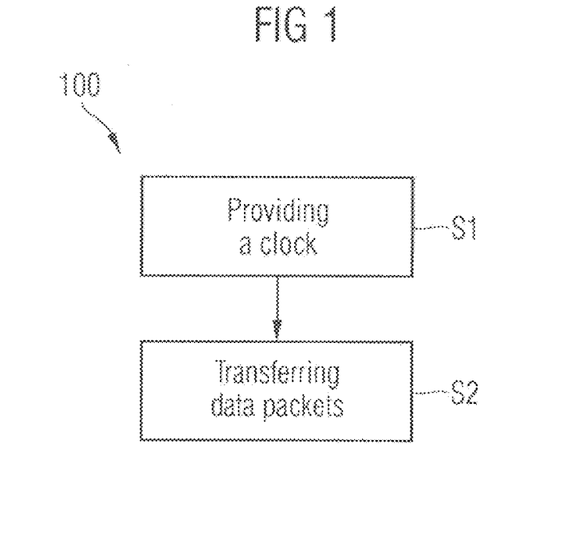
FIG. 1 is a schematic flowchart of a method 100 as one exemplary embodiment.

FIG. 1 shows a schematic flowchart of a method 100 as one exemplary embodiment. The method 100 includes two steps S1 and S2. In the first step S1, a clock with a clock period is provided. An integer multiple of the clock period defines a periodic time grid. In the second step S2, data packets are transferred between a baseband assembly and a radio-frequency assembly. Here, the times of the start of the transfer vary with respect to the times of the periodic time grid. Note that FIG. 1 does not necessarily imply step S2 to succeed step S1. Rather, steps S1 and S2 may be performed concurrently.

The method 100 may be applied for a data transfer in any desirable direction, i.e. from the baseband assembly to the radio-frequency assembly, vice versa or in both directions. A more thorough understanding of method 100 will be provided by the following figures and their description.

Figure 2:
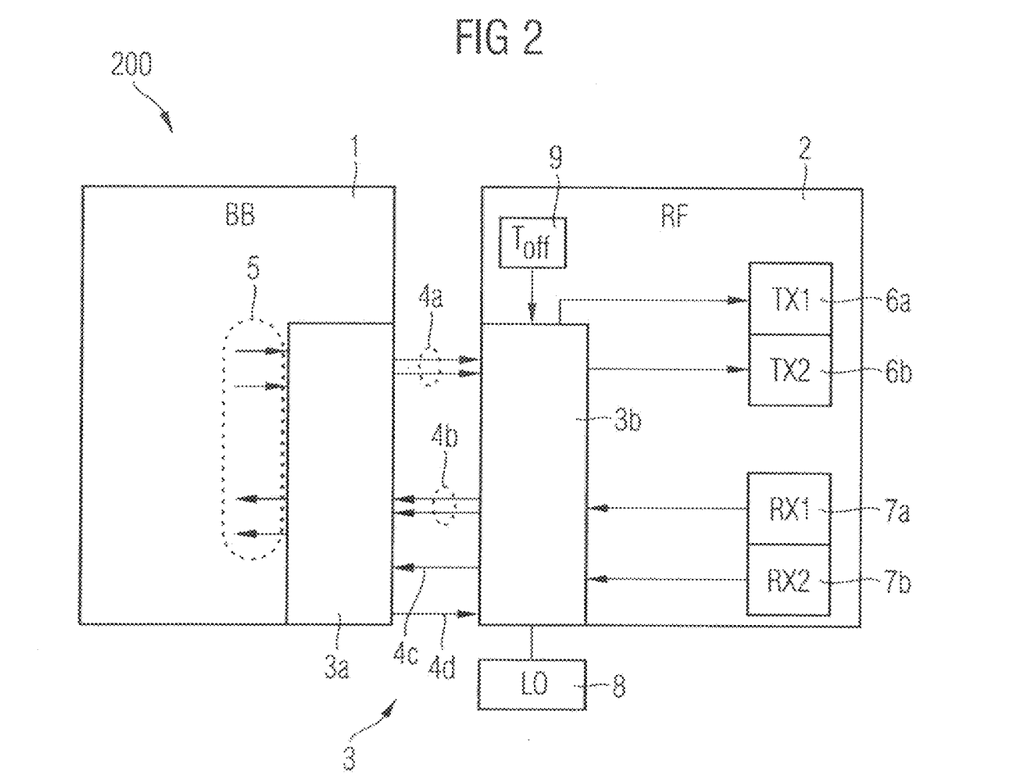
FIG. 2 is a schematic illustration of a mobile radio transceiver 200 as one exemplary embodiment.

FIG. 2 shows a schematic illustration of a mobile radio transceiver 200 as one exemplary embodiment. The illustration of the mobile radio transceiver 200 is a schematic and therefore does not necessarily include all components required for an actual operation of a mobile radio transceiver. The method 100 of FIG. 1 may be read in connection with the mobile radio transceiver 200 in one embodiment.

The mobile radio transceiver 200 includes a baseband assembly 1 (BB) and a radio-frequency assembly 2 (RF) coupled to one another via an interface 3. In one embodiment, the interface 3 includes an interface 3a associated with the baseband assembly 1, an interface 3b associated with the radio-frequency assembly 2, and data lines 4a, 4b, 4c and 4d coupling the two interfaces 3a and 3b to one another.

The interface 3a of the baseband assembly 1 is connected to further components (not shown) of the baseband assembly 1 via signal paths (not shown). Data which is interchanged via the signal paths between the interface 3a and the further components of the baseband assembly 1 is indicated by data lines 5 in the form of arrows. For example, the interchanged data may include payload data and/or control data; however, other types of data may be employed and are contemplated as falling within the scope of the invention.

The radio-frequency assembly 2 includes a first transmission path being connected to the interface 3b and having a first transmission unit (TX1) 6a, and a second transmission path being connected to the interface 3b and having a second transmission unit (TX2) 6b. In addition, the radio-frequency assembly 2 includes a first reception path being connected to the interface 3b and having a first reception unit (RX1) 7a, and a second reception path being connected to the interface 3b and having a second reception unit (RX2) 7b. The interface 3b is connected to a unit ($T_{off}$) 9 configured to provide a variable time offset. It is noted that the baseband assembly 1 may also include a unit to provide a variable time offset (not shown) which may be connected to the interface 3a. The function of the unit 9 and the application of the variable time offset will be explained later. The radio-frequency assembly 2 may be coupled to an external local oscillator ($L_o$) 8.

In the embodiment of FIG. 2, the baseband assembly 1 and the radio-frequency assembly 2 are implemented in the form of two integrated circuits, i.e. the assemblies are implemented on physically separate substrates. In this case, the assemblies 1 and 2 are implemented in the form of two chips (which are frequently referred to in the art as a baseband chip and a radio-frequency chip). However, in another embodiment, it is likewise possible in chip manufacture to implement the baseband assembly 1 and the radio-frequency assembly 2 on one common substrate.

The baseband assembly 1 processes signals in the baseband, while the radio-frequency assembly 2 at least partly processes signals in a radio-frequency band. In the baseband assembly 1, a low-frequency baseband signal is produced and processed by digital signal processing steps. This signal is processed further within the radio-frequency assembly 2 and is shifted to a radio frequency by the latter's components.

It is to be noted that the separation between the baseband assembly 1 and the radio-frequency assembly 2 is not standard or well-defined in mobile radio engineering. For example, one possibility of distinguishing between the baseband assembly 1 and the radio-frequency assembly 2 may be provided by implementing a standardized interface 3, as shown in FIG. 2. By way of example, the interface 3 may be based on the DigRF Dual-Mode Baseband/RF IC interface standard, which defines a physical connection between baseband assemblies and radio-frequency assemblies in mobile radio transceivers. For this case, the DigRF interface provides logical channels for payload data, control data and timing data for the time control of the components of the baseband assembly 1 and the radio-frequency assembly 2. All versions of the DigRF-Standard are incorporated in this specification by reference. Latest versions of the DigRF-Standard are: DigRF 3.9G v4, 2008 and DigRF 3G v3.09, 2008.

The baseband assembly 1 may include components which are not explicitly shown in FIG. 2. An example might be a digital signal processor employed for digital baseband signal processing. Exemplary method steps for signal processing in the baseband assembly 1 are encoding or interleaving of data that is to be transferred by the mobile radio transceiver 200. In addition, the baseband assembly 1 may include a sampling unit for sampling a signal.

The components of the radio-frequency assembly 2 at least partly process signals in the radio-frequency band, the processing being either of a digital nature or of an analog nature. The transmission units 6a, 6b and the reception units 7a, 7b of the radio-frequency assembly 2 may be implemented in any form and may include both analog and digital standard components. By way of example, the transmission units 6a, 6b may include a transmitted signal path with one or more digital filters for filtering the transmitted signals, a digital/analog converter for converting the digital transmitted signal into an analog signal, a modulator for applying a particular modulation scheme, an up-conversion mixer for shifting the analog transmitted signal into the radio-frequency band, a channel filter for filtering the radio-frequency signal and a line driver or a power amplifier for outputting the amplified signal to a transmission antenna (not shown).

The reception units 6a, 6b may include a received signal path with a channel filter fed by an antenna (not shown), a down-conversion mixer for down-converting filtered received signals to an intermediate frequency band or to the baseband, a demodulator adapted to demodulate modulated data that is modulated according to a particular modulation scheme, a sampling unit for sampling a signal, an analog/digital converter for converting the analog received signal into a digital signal and one or more filters for filtering the received signals.

In FIG. 2, the radio-frequency assembly 2 includes a plurality of transmission paths and a plurality of reception paths, i.e. the mobile radio transceiver 200 is a multimode system. The transmission and reception paths can process (modulate, filter, etc.) transmitted and/or received data on the basis of various mobile radio standards. By way of example, these may be the mobile radio standards UMTS (Universal Mobile Telecommunications System), GSM (Global System for Mobile Communications)/EDGE (Enhanced Data Rates for GSM Evolution) and LTE (Long Term Evolution), that is to say 2G standards, 2.5G standards, 3G standards, HSPA (High Speed Packet Access) or other mobile radio standards.

The data processed in the baseband assembly 1 is transferred via the data lines 4a, which may be implemented in the form of differential line pairs from the interface 3a of the baseband assembly 1 to the interface 3b of the radio-frequency assembly 2. In one embodiment, the data transfer may take place in serial, digital, packet-oriented form. The data received by the interface 3b is processed in the corresponding transmission path on the basis of the chosen mobile radio standard so as then to be emitted by one or more transmission antenna (not shown). The processing in the radio-frequency assembly 2 includes, inter alia, modulation of the data to be transferred on the basis of a modulation scheme which is used within the framework of the chosen mobile radio standard.

In the radio-frequency assembly 2, data received via one or more antennas (not shown) is processed in the corresponding reception path on the basis of the chosen mobile radio standard. By way of example, the processing includes sampling of the received signal and demodulation of received data. The interface 3b receives the data processed in the radio-frequency assembly 2 and transfers the data via data lines 4b, which may be implemented in one embodiment in the form of differential line pairs to the interface 3a of the baseband assembly 1. In one embodiment, said data transfer may take place in serial, digital, packet-oriented form.

The interfaces 3a and 3b are coupled to one another by the data lines 4c and 4d. The data line 4c is used to transmit the system clock generated by the local oscillator 8 from the radio-frequency assembly 2 to the baseband assembly 1. If the baseband assembly 1 requires the system clock, it can request it from the radio-frequency assembly 2 using a control signal. In one embodiment, the system clock is the master reference clock for both the baseband assembly 1 and the radio-frequency assembly 2, from which all other interface clocks may be derived. Possible values for the frequency $f_{sys}$ of the system clock are: 19.2 MHz, 26.0 MHz and 38.4 MHz. Of course, other values are equally possible.

The transceiver 200 may further include a frequency synthesizer (not shown) connected to the reference oscillator 8. For example, the frequency synthesizer may be a Phased Locked Loop (PLL). The frequency synthesizer is configured to receive the system clock, generate a clock signal having any of an arbitrary range of frequencies and provide said clock signal to another component of the transceiver 200. In particular, the frequency synthesizer is configured to provide a clock signal having a frequency $f_{clock}$ which corresponds to the frequency of the system clock $f_{sys}$ multiplied by an arbitrary factor N, i.e. $f_{clock} = N \times f_{sys}$. N may be an integer or a fraction number. The frequency synthesizer may be included in the baseband assembly 1 or the radio-frequency assembly 2. Alternatively, each one of the assemblies 1 and 2 may have its own frequency synthesizer.

The clock signal provided by the frequency synthesizer may be used to clock a data transfer between the baseband assembly 1 and the radio-frequency assembly 2 and/or vice versa via lines 4a and/or lines 4b. Here, a time interval for transferring a bit of a data packet may correspond to the clock period $\Delta t_{clock}$ (i.e. $(f_{clock})^{-1}$) of the synthesized clock provided by the frequency synthesizer. Said time interval may also be referred to as "unit interval". Possible values for the frequency $f_{clock}$ are: 1248 MHz, 1456 MHz, 1459.2 MHz, 2496 MHz, 2912 MHz and 2918.4 MHz. Of course, other values are equally possible.

Figure 3:
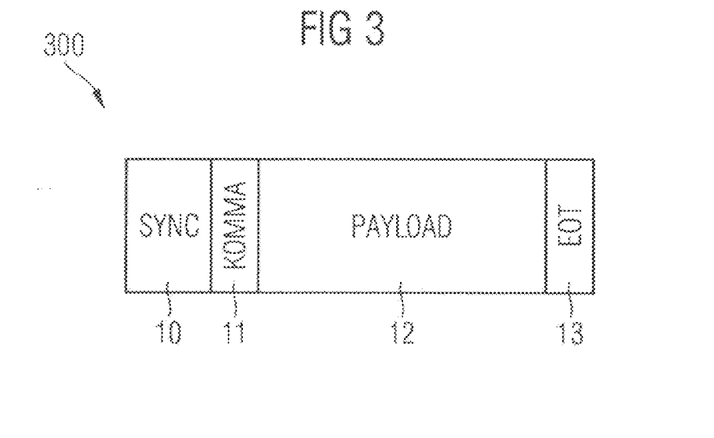
FIG. 3 is a schematic illustration of a data packet 300.

FIG. 3 is a schematic illustration of a data packet 300 as it may be transferred between the baseband assembly 1 and the radio-frequency assembly 2 of FIG. 2. The data packet 300 includes four data fields 10, 11, 12 and 13, respectively. In one embodiment, the structure of each data field is based on a 8b10b-coding scheme, in which each byte of information is encoded by a symbol of 10 bits. That is, the symbol time duration $t_{symbol}$ corresponds to the tenfold of the clock period $\Delta t_{clock}$, i.e. $t_{symbol} = 10 \times \Delta t_{clock}$. Generally, any integer number of clock periods $\Delta t_{clock}$ may correspond to the symbol time duration $t_{symbol}$.

The first data field 10 is optional and may include up to e.g. fifteen symbols. The first data field 10 may be used for adjusting the phase of a frequency synthesizer (e.g. a PLL) providing a clock for a data transfer between the assemblies 1 and 2.

The second data field 11 may be referred to as KOMMA or K-CODE and includes e.g. one symbol. The second data field 11 also may be used for synchronization purposes either. The third data field 12 may include an arbitrary number of symbols which may be referred to as D-CODES representing payload data. The fourth data field 13 (cf. EOT (End Of Transmission)) may include one symbol and marks the end of the data packet 300. It is to be noted that the structures of the data fields 10, 11 and 12 are similar for multiple data packets transmitted between the assemblies 1 and 2. However, the payload data fields 12 of such multiple data packets may differ in their size and content.

Figure 4:
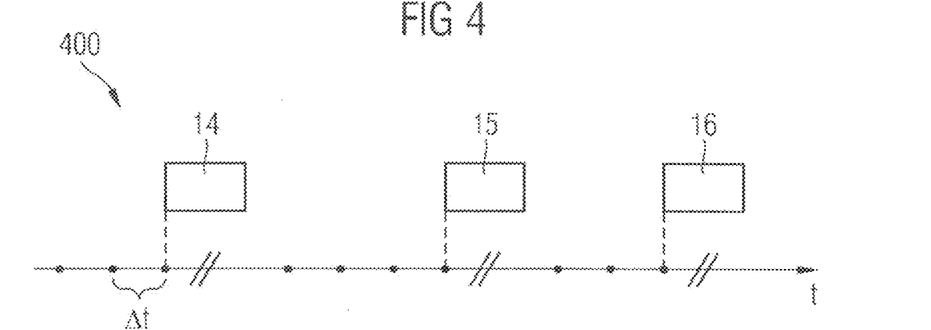
FIG. 4 is a timing scheme 400 for transferring data packets.

FIG. 4 shows a timing scheme 400 for transferring data packets, for example between the baseband assembly 1 and the radio-frequency assembly 2 of FIG. 2. Three exemplary data packets 14, 15 and 16 are shown which may have a data packet structure as shown in FIG. 3. The time direction is indicated by a horizontal axis, wherein equidistant dots on the time axis arranged between the data packets 14, 15 and 16 indicate times of a periodic time grid. Note that FIG. 4 does not display times of the periodic time grid occurring during the transmission of the data packets 14, 15 and 16. Instead, during the transmission time periods of the data packets, the time axis is interrupted by two parallel slashes, respectively. These interruptions are meant to indicate that the length of the data packets 14 to 16 may in principle be of arbitrary size.

As already explained in connection with FIG. 2, components of the transceiver 200 may provide a clock period $\Delta t_{clock}$ which corresponds to the time interval required for transferring a bit of a data packet. The time interval $\Delta t$ between two successive dots in FIG. 4 corresponds to an integer multiple of the clock period $\Delta t_{clock}$. Here, the integer multiple has a value greater than one, in particular ten. For the case of the integer multiple having a value of ten, ten bits (i.e. one symbol) may be transferred in a time interval $\Delta t$, i.e. $\Delta t = 10 \times \Delta t_{clock}$.

In FIG. 4, the time of the start of the transfer of a data packet coincides with a time of the periodic time grid. The time interval between the end of a data packet and the start of the successive data packet corresponds to an integer multiple of the time interval $\Delta t$ and may have arbitrary length. The lengths of the data packets 14 to 16 may differ from one another depending on the size of included payload data.

The above mentioned values associated with the clock period $\Delta t_{clock}$ may result in data rates up to more than two Gbit/s for a data transfer between the assemblies 1 and 2. If the data transfer via interface 3 is based on the timing shown in the timing scheme 400 of FIG. 4, the start of transferred data packets coincide with the times of the regular time grid. Then, a certain synchronization pattern might reoccur and the transfer of the data packets may be of periodic character. A periodicity in transferring data may lead to electromagnetic radiation of enhanced amplitude generated and emitted by the interface 3 as well as by components of the assemblies 1 and 2. For example, radiation might be caused by line drivers, amplifiers, filters and antenna modules of the radio-frequency assembly 2. The frequency of such electromagnetic radiation corresponds to the above-mentioned data rates (i.e. values up to more than two Gbit/s). For example, a frequency within a frequency range between the clock frequency and the fivefold of the clock frequency may lie in a mobile radio frequency range. Due to the vicinity of the assemblies 1 and 2 and the interface 3, crosstalk may occur between components included therein.

To assure a good transmission and reception quality of a mobile radio transceiver 200, the electromagnetic radiation emitted by components of the transceiver 200 and in particular electromagnetic radiation emitted into the radio-frequency assembly 2 should be prevented or minimized. More particularly, electromagnetic crosstalk having a frequency lying in a mobile radio frequency range (i.e. within the frequency range of the transmission and reception bands of the transceiver) may result in a degradation of transmission and reception quality of the transceiver 200. It is to be noted that besides the basic frequency of the crosstalk, overtones of the crosstalk also may lie in the mobile frequency range.

Figure 5:
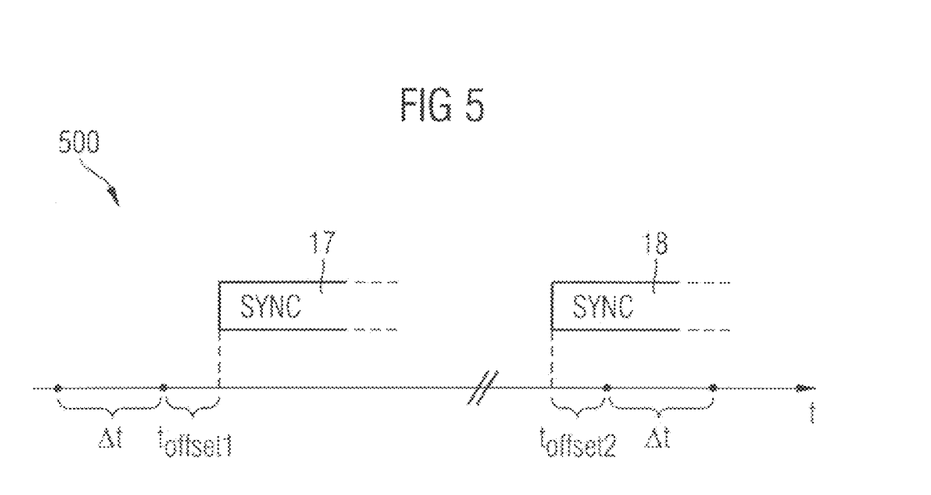
FIG. 5 is a timing scheme 500 for transferring data packets.

FIG. 5 shows a timing scheme 500 for transferring data packets, for example between the baseband assembly 1 and the radio-frequency assembly 2 of FIG. 2. Specifications made in connection with FIG. 4 may also apply to FIG. 5. Two exemplary data packets 17 and 18 are illustrated, which may have a data packet structure as shown in FIG. 3. Note that FIG. 5 merely shows the first data field (cf. SYNC) of the data packets 17 and 18, while further data fields of the data packets 17 and 18 are omitted for ease of illustration. Again, the time direction is indicated by a horizontal axis, wherein equidistant dots on the time axis indicate times of a periodic time grid. The time interval between two successive dots is denoted by $\Delta t$. Note further that FIG. 5 does not display times of the periodic time grid occurring between the data packets 17 and 18. Instead, the time axis is interrupted by two parallel slashes located between the data packets 17 and 18. This interruption is meant to indicate that the number of dots occurring between the data packets 17 and 18 is arbitrary.

In contrast to FIG. 4, the time of the start of the data packet 17 does not coincide with a time of the periodic time grid. In FIG. 5, the time of the start of the data packet 17 is rather shifted by a variable time offset $t_{offset1}$ to a later time. In a similar way, the time of the start of the data packet 18 is shifted by a variable time offset $t_{offset2}$ to an earlier time. Note that the time offsets $t_{offset1}$ and $t_{offset2}$ are of variable character and do not need to coincide. That is, the times of the start of the transfer of the data packets according to the timing scheme 500 may vary with respect to the times of the periodic time grid.

The variable time offsets may correspond to an integer number of clock periods and may range from a value of $\pm 1 \times \Delta t_{clock}$ to a value of $\pm 9 \times \Delta t_{clock}$. Referring back to FIG. 2, the variable time offsets may be generated by unit 9. In one embodiment, the time offsets are generated by employing a random algorithm. For example, a random sequence of variable time offsets may be generated by a pseudo-random generator such as e.g. a feedback shift register. It should be understood, however, that other manners of generating random time offsets may be employed, all such alternatives are contemplated as falling within the scope of the present invention. It is to be noted that the variable time offsets may also be used for transferring data from the baseband assembly 1 to the radio-frequency assembly 2. In view of this and other cases, the baseband assembly 1 may optionally be equipped with a time offset generation unit (not shown) similar or identical to unit 9, however coupled to interface 3a associated with the baseband assembly 1.

From FIG. 5, the method steps S1 and S2 of method 100 may be derived. Referring back to FIG. 1, the clock period of step S1 corresponds to $\Delta t_{clock}$, while the dots on the time axis of FIG. 5 correspond to the periodic time grid specified by step S1. FIG. 5 further shows that the times of the start of the transfer vary with respect to the times of the periodic time grid (cf. step S2 of method 100).

In contrast to the timing scheme of FIG. 4, the timing scheme 500 advantageously reduces electromagnetic radiation emitted by components of the transceiver 200. By employing the variable time offset, a periodic transmission of data packets between the assemblies 1 and 2 is avoided. This is because the times of the start of the data packets may randomly vary with respect to the times of the periodic time grid. This variation leads to a reduction of crosstalk between components and improves transmission and reception quality of the transceiver. A comparison between power density spectrums of transceivers operating according to the timing schemes 400 and 500 will be explained in FIGS. 9 and 10.

Figure 6:
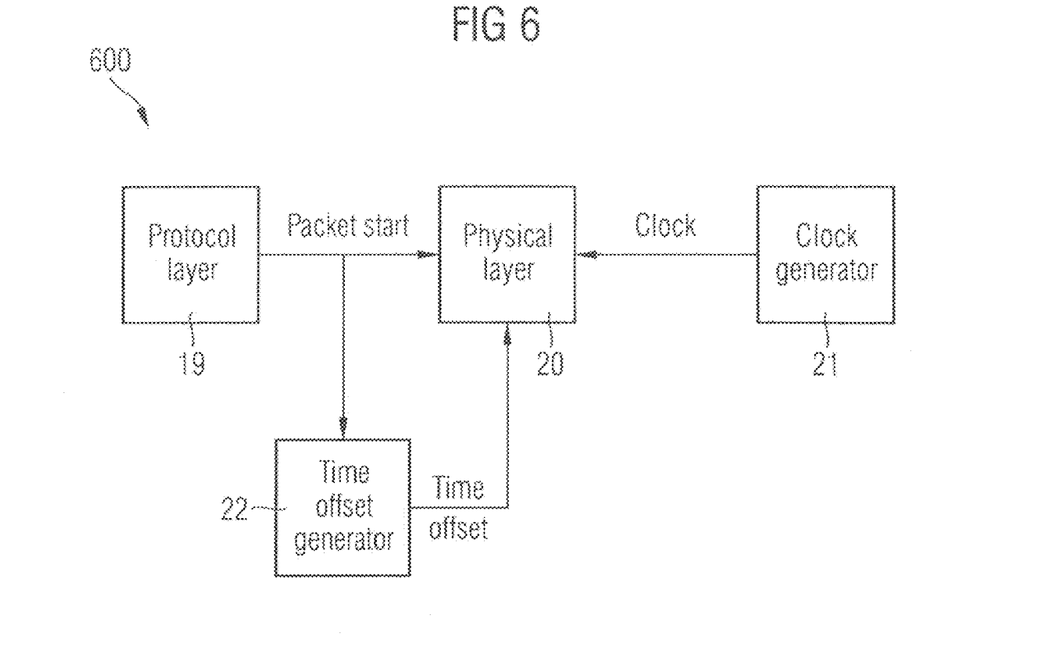
FIG. 6 is a schematic illustration of units within a mobile radio transceiver 600 which are associated with a digital interface as one exemplary embodiment.

FIG. 6 shows a schematic illustration of units within a mobile radio transceiver 600 which are associated with the digital interface 3 as one exemplary embodiment. The illustration of the mobile radio transceiver 600 is functional and schematic and therefore does not necessarily include all components which are required for an actual operation of a mobile radio transceiver. The arrangement of FIG. 6 may be read in connection with previous figures, in particular FIGS. 2 and 5. The arrangement of FIG. 6 includes a functional entity 19 associated with a protocol layer, a functional entity 20 associated with a physical layer, a clock generator 21 and a unit 22 configured to provide a variable time offset. The unit 22 corresponds to the unit 9 of FIG. 2, while the functional entity 20 associated with the physical layer 20 includes the interface components 3a to 4d of FIG. 2. The clock generator 21 provides a clock employed for transferring data packets between assemblies, wherein a time interval for transferring a bit of a data packet may correspond to the clock period of the clock. Possible values for the frequency of such a clock were already provided in foregoing paragraphs. In one embodiment, the clock generator 21 may correspond to the frequency synthesizer of FIG. 2 or a combination of the frequency synthesizer with the local oscillator 8.

The functional entity 19 associated with the protocol layer 19 provides information to guarantee a correct communication between a baseband assembly and a radio-frequency assembly via an interface. For example, the functional entity 19 associated with the protocol layer 19 provides the data packet structure (e.g., structure 300 of FIG. 3) used for a communication between the assemblies and further ensures a correct interpretation of received data packets. The data packets exchanged between assemblies are defined by a protocol underlying the communication. Details on an exemplary DigRF-Protocol layer according to one embodiment may become apparent from specifications of the DigRF-Standard as mentioned before.

The functional entity 19 associated with the protocol layer provides a signal (e.g., "packet start" to the functional entity 20 associated with the physical layer and to the time offset generator 22, and the unit 22 indicates the start of a transmission of a data packet. Moreover, the time offset generator 22 and the clock generator 21 provide a variable time offset and a clock to the physical layer 20, respectively. Receiving the described signals from components 19, 21 and 22, the functional entity 20 associated with the physical layer may operate according to the timing scheme 500 of FIG. 5. Note that the information provided by the functional entity 19 associated with the protocol layer corresponds to a time of a periodic time grid (cf. e.g. dots in FIG. 5). By combining both the information on the start of the data packet and the information on the variable time offset, shifted times (cf. start of data packets in FIG. 5) may be generated.

Figure 7:
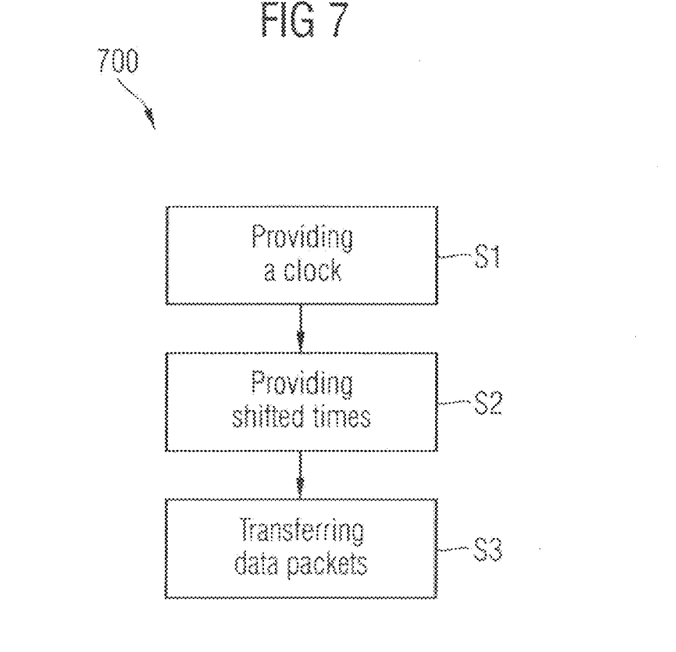
FIG. 7 is a schematic flowchart of a method 700 as one exemplary embodiment.

FIG. 7 shows a schematic flowchart of a method 700 as one exemplary embodiment. The method 700 includes three steps S1 to S3 and may be read in connection with FIGS. 2 and 5. In the first step S1, a clock having a clock period is provided. Referring back to the specification of FIGS. 2 and 5, said clock period may correspond to the time interval $\Delta t_{clock}$. An integer multiple of the clock period defines a periodic time grid having a period of $\Delta t$ similar to the one shown in FIG. 5.

In the second step S2, offset times are provided that are shifted with respect to the times of the periodic time grid by a variable, e.g. randomly variable time offset. Referring back to FIG. 5, the shifted times correspond to the times of the start of the data packets 17 and 18. Moreover, the variable time offsets correspond to the offsets $t_{offset1}$ and $t_{offset2}$.

In step S3, data packets are transferred between a baseband assembly and a radio-frequency assembly, wherein the times of the start of the transfer correspond to the shifted times (cf. step S2). Similar to the method of FIG. 1, method 700 may be applied for a data transfer in any desirable direction, i.e. from the baseband assembly to the radio-frequency assembly, vice versa or in both directions.

Figure 8:
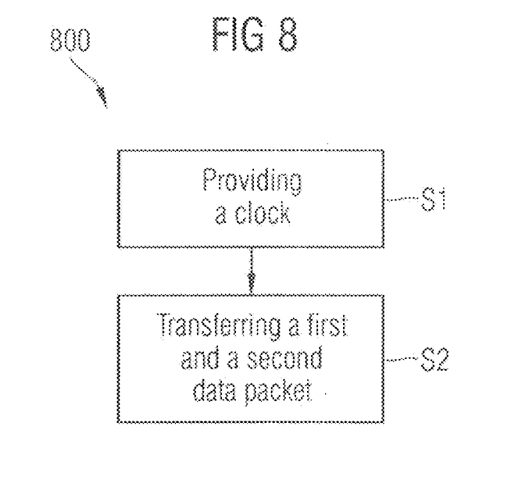
FIG. 8 is a schematic flowchart of a method 800 as one exemplary embodiment.

FIG. 8 shows a schematic flowchart of a method 800 as one exemplary embodiment. The method 800 includes two steps S1 and S2 and may be read in connection with FIGS. 2 and 5. In the first step S1, a clock with a clock period is provided. Referring back to the specification of FIG. 2, the clock period may correspond to the time interval $\Delta t_{clock}$. An integer multiple of the clock period defines a periodic time grid having a period $\Delta t$ as indicated in FIG. 5.

In the second step S2, a first and a second data packet are transferred between a baseband assembly and a radio-frequency assembly. Here, the time interval between the end of the first data packet and the start of the second data packet differs from time intervals between times of the periodic time grid. This feature can be seen from FIG. 5, with the first and the second data packets of method 800 corresponding to the data packets 17 and 18, respectively. From FIG. 5, it is apparent that the start of data packet 17 varies from the nearest time grid point by a time offset $t_{offset1}$, while the start of data packet 18 varies from the nearest time grid point by a time offset $t_{offset2}$. For the case the time offsets $t_{offset1}$ and $t_{offset2}$ differing from one another, the time interval between the time of the end of data packet 17 and the time of the start of data packet 18 cannot coincide with any distance between two arbitrary points of the periodic time grid. Again, method 800 may be applied for a data transfer in any desirable direction, i.e. from the baseband assembly to the radio-frequency assembly, vice versa or in both directions.

Figure 9:
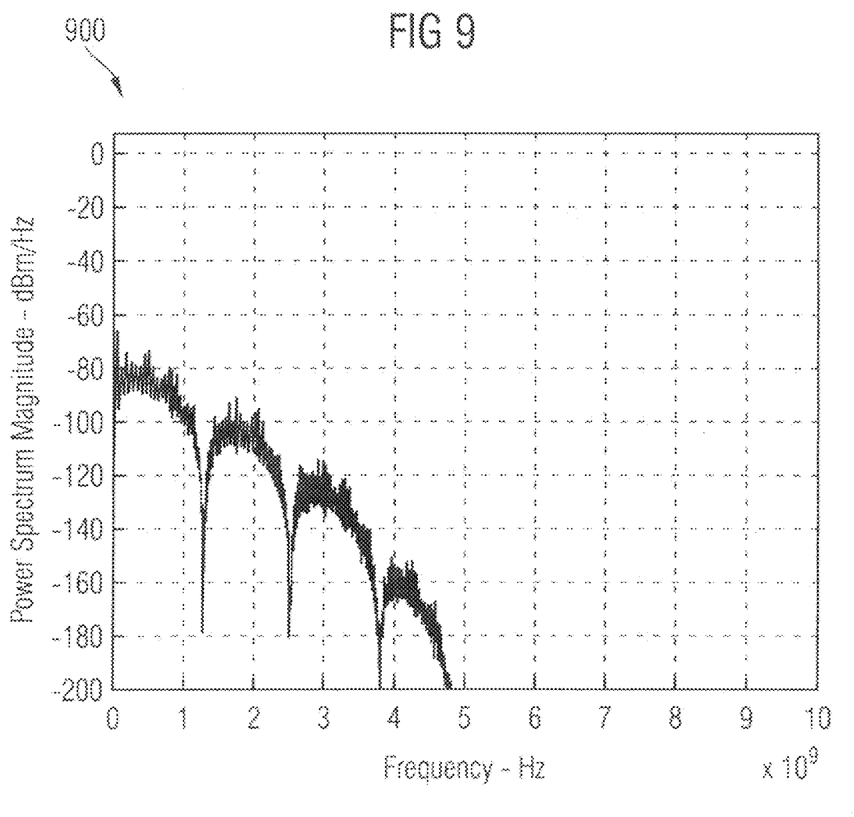
FIG. 9 is a power density spectrum 900 of a signal transmitted according to the timing scheme 400 of FIG. 4.

FIG. 9 shows a power density spectrum 900 of a signal transferred according to the timing scheme 400 of FIG. 4, for example between the baseband assembly 1 and the radio-frequency assembly 2 of FIG. 2. The vertical axis refers to the power spectrum magnitude of the signal in units of –dBm/Hz, while the horizontal axis refers to the frequency of the signal in units of GHz. The illustrated spectrum is based on a clock $f_{clock}$ of 1248 MHz applied for the data transfer between the assemblies. The spectrum of FIG. 9 includes four arched structures and in-between minimums at frequencies of 1.248 GHz, 2.496 GHz, 3.744 GHz and 4.992 GHz. Note that the frequencies of the minimums correspond to integer multiples of the frequency $f_{clock}$. Each one of the arched structures shows a substructure including a variety of small peaks. The amplitudes of these small peaks may lie in a range up to 20 dBm/Hz.

Figure 10:
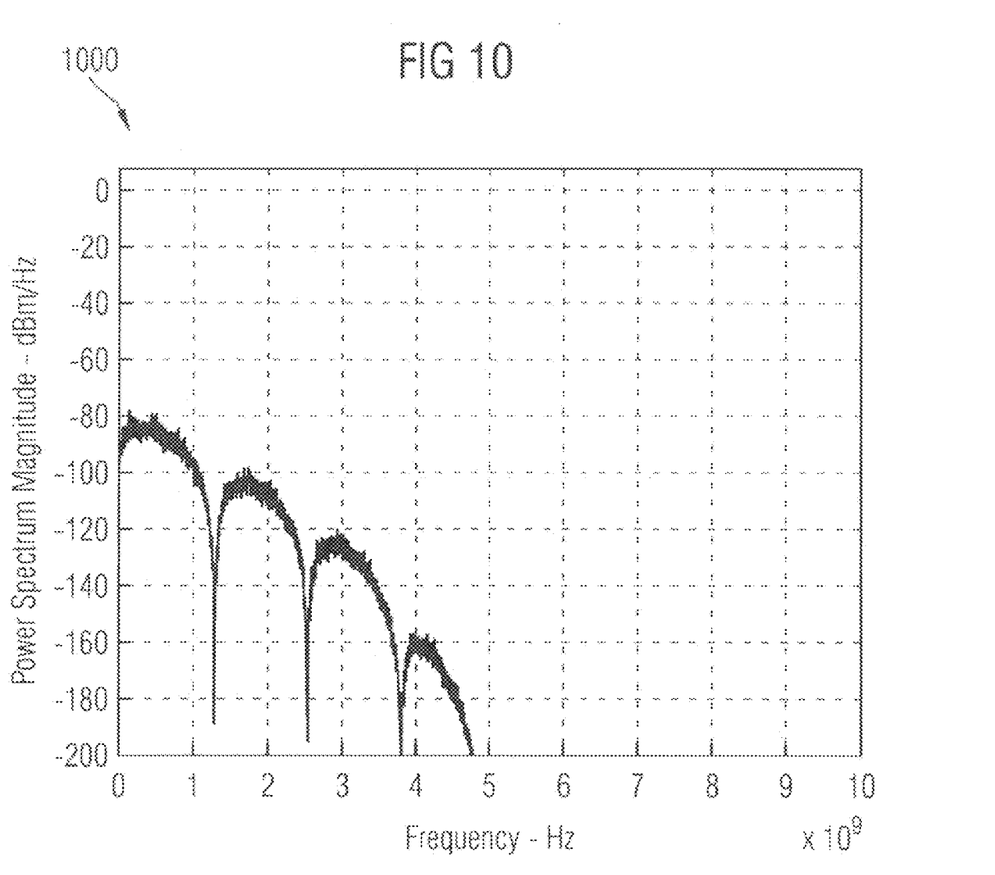
FIG. 10 is a power density spectrum 1000 of a signal transmitted according to the timing scheme 500 of FIG. 5.

FIG. 10 shows an exemplary power density spectrum 1000 of a signal transferred according to the timing scheme 500 of FIG. 5, for example between the baseband assembly 1 and the radio-frequency assembly 2 of FIG. 2. Again, the vertical axis refers to the power spectrum magnitude of the signal in units of –dBm/Hz, while the horizontal axis refers to the frequency of the signal in units of GHz. The shown spectrum is based on a clock $f_{clock}$ of 1248 MHz applied for the data transfer between the assemblies. Similar to FIG. 9, the spectrum of FIG. 10 includes four arched structures and in-between minimums at frequencies of 1.248 GHz, 2.496 GHz, 3.744 GHz and 4.992 GHz. Each one of the arched structures shows a substructure including a variety of small peaks. The amplitudes of these small peaks may lie in a range up to 10 dBm/Hz. Note that the power density spectrum shown in FIG. 10 is to some extend dependent on the implementation of the transceiver and thus should only be understood only as one possible example.

A comparison of FIGS. 9 and 10 shows three main differences between the spectrums depicted therein. First, the small peaks in the substructures of the arched structures of FIG. 10 show amplitudes that are reduced by up to 50% (cf. FIG. 9: 20 dBm/Hz; FIG. 10: 10 dBm/Hz) in contrast to the amplitudes of the small peaks of FIG. 9. Second, the averaged amplitudes of the arched structures are smaller for the case of FIG. 10. The third difference between the spectrums 900 and 1000 does not necessarily become fully apparent from FIGS. 9 and 10 due to scaling reasons. However, calculations may show that the minimum values of FIG. 10 may slightly be shifted to smaller or greater frequencies compared to the minimum values of FIG. 9.

Applying the timing scheme of FIG. 5 thus may result in two advantageous effects compared to an application of the timing scheme of FIG. 4. First, electromagnetic emissions and crosstalk occurring in the transceiver are generally reduced. And second, the spectrum of electromagnetic emissions might be shifted to higher or lower frequencies in such a way that the amplitudes of radiation lying in a mobile radio frequency range might be reduced.

Although the invention has been shown and described with respect to a certain aspect or various aspects, it is evident that equivalent alterations and modifications will occur to others skilled in the art upon the reading and understanding of this specification and the annexed drawings. In particular, in regard to the various functions performed by the above described components (assemblies, devices, circuits, etc.), the terms (including a reference to as "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments.

In addition, while a particular feature of the invention may have been disclosed with respect to only one of several aspects of the invention, such feature may be combined with one or more features of other aspects as may be desired and advantageous for any given or particular application. Furthermore, to the extent that the term "include" is used in either the detailed description or the claims, such term is intended to be inclusive in a manner similar to the term "comprising". Also, exemplary is merely intended to mean an example, rather than the best.

What is claimed is:

1. A method comprising:
providing a clock having a clock period, wherein an integer multiple of the clock period defines a periodic time grid; and
transferring data packets between a baseband assembly and a radio-frequency assembly, wherein the times of the start of the data packet transfers are offset with respect to the times of the periodic time grid.

2. The method of claim 1, wherein a time interval for transferring a bit of the data packets corresponds to the clock period.

3. The method of claim 1, wherein the integer multiple has an absolute value greater than one.

4. The method of claim 1, wherein a frequency within a frequency range between a clock frequency defined by the clock period and a fivefold of the clock frequency lies in a mobile radio frequency range.

5. The method of claim 1, wherein the times of the start of the data packet transfers are shifted with respect to the times of the periodic time grid by a variable time offset.

6. The method of claim 5, wherein the variable time offset is an integer number of clock periods.

7. The method of claim 5, wherein the variable time offset is a random offset value.

8. The method of claim 1, wherein the data packet is transferred in a serial, digital, packet-oriented format.

9. The method of claim 1, wherein a data packet comprises a plurality of data symbols, and wherein the symbol time duration corresponds to the integer multiple of the clock period.

10. A method comprising:
providing a clock having a clock period, wherein an integer multiple of the clock period defines a periodic time grid;
providing times shifted with respect to the times of the periodic time grid by a variable time offset; and
transferring data packets between a baseband assembly and a radio-frequency assembly, wherein the times of the start of the transfers correspond to the shifted times, respectively.

11. The method of claim 10, wherein a time interval for transferring a bit of the data packets corresponds to the clock period.

12. The method of claim 10, wherein a frequency within a frequency range between a clock frequency defined by the clock period and a fivefold of the clock frequency lies in a mobile radio frequency range.

13. The method of claim 10, wherein the variable time offset is an integer number of clock periods.

14. The method of claim 10, wherein the variable time offset is a random offset value.

15. The method of claim 10, wherein a data packet comprises a plurality of data symbols, and wherein the symbol time duration corresponds to the integer multiple of the clock period.

16. The method of claim 10, wherein the data packet is transferred in a serial, digital, packet-oriented format.

17. A method comprising:
providing a clock having a clock period, wherein an integer multiple of the clock period defines a periodic time grid; and
transferring a first data packet and a second data packet between a baseband assembly and a radio-frequency assembly, wherein the time interval between the end of the first data packet and the start of the second data packet differs from time intervals between times of the periodic time grid and integer multiples thereof.

18. The method of claim 17, wherein a time interval for transferring a bit of the first and second data packets corresponds to the clock period.

19. The method of claim 17, wherein a frequency within a frequency range between a clock frequency defined by the clock period and a fivefold of the clock frequency lies in a mobile radio frequency range.

20. The method of claim 17, wherein the first and second data packets each comprise a plurality of data symbols, and wherein the symbol time duration corresponds to the integer multiple of the clock period.

21. A transceiver comprising:
a baseband assembly;
a radio-frequency assembly; and a first unit configured to provide a clock having a clock period, wherein an integer multiple of the clock period defines a periodic time grid, wherein the transceiver is configured to transfer data packets between the baseband assembly and the radio-frequency assembly, and wherein the times of the start of the data packet transfers are offset with respect to the times of the periodic time grid.

22. The transceiver of claim 21, further comprising: a second unit configured to generate a variable time offset, wherein the times of the start of the data packet transfers are shifted with respect to the times of the periodic time grid by the variable time offset.

23. The transceiver of claim 21, further comprising: an interface arranged between the baseband assembly and the radio-frequency assembly, wherein the interface is configured to transfer the data packets in a serial, digital, packet-oriented format.

24. A transceiver comprising:
a baseband assembly;
a radio-frequency assembly;
a first unit configured to provide a clock having a clock period, wherein an integer multiple of the clock period defines a periodic time grid; and
a second unit configured to provide a variable time offset, wherein the transceiver is configured to provide times shifted with respect to the times of the periodic time grid by the variable time offset, and is further configured to transfer data packets between the baseband assembly and the radio-frequency assembly, wherein the times of the start of the data packet transfers correspond to the shifted times, and at least two of the shifted times for two data packet transfers are different from one another.

25. The device of claim 24, wherein the variable time offset is a random offset value.

* * * * *